(12) United States Patent
Ikeda

(10) Patent No.: US 7,769,771 B2
(45) Date of Patent: Aug. 3, 2010

(54) SEARCHING A DOCUMENT USING RELEVANCE FEEDBACK

(75) Inventor: Tetsuya Ikeda, Tokyo-to (JP)

(73) Assignee: Ricoh Company, Ltd., Tokyo (JP)

( * ) Notice: Subject to any disclaimer, the term of this patent is extended or adjusted under 35 U.S.C. 154(b) by 374 days.

(21) Appl. No.: 11/880,264

(22) Filed: Jul. 19, 2007

(65) Prior Publication Data
US 2008/0021891 A1 Jan. 24, 2008

(30) Foreign Application Priority Data
Jul. 19, 2006 (JP) .............................. 2006-196428

(51) Int. Cl.
*G06F 7/00* (2006.01)
*G06F 17/30* (2006.01)

(52) U.S. Cl. .................. 707/759; 707/765; 707/766

(58) Field of Classification Search ............... 707/1, 707/2, 3, 5, 102, 999.001, 999.002, 999.003, 707/999.004, 999.005, 999.102, 759, 765, 707/766; 715/234
See application file for complete search history.

(56) References Cited

U.S. PATENT DOCUMENTS

| 5,987,457 | A  | * | 11/1999 | Ballard ........................ 707/5 |
| 6,349,307 | B1 | * | 2/2002  | Chen ...................... 707/103 X |
| 6,829,599 | B2 | * | 12/2004 | Chidlovskii .................... 707/3 |
| 6,968,332 | B1 | * | 11/2005 | Milic-Frayling et al. ........ 707/3 |
| 7,185,001 | B1 | * | 2/2007  | Burdick et al. ................. 707/3 |
| 7,412,442 | B1 | * | 8/2008  | Vadon et al. .................... 707/5 |
| 7,574,426 | B1 | * | 8/2009  | Ortega ............................. 707/3 |
| 2003/0187836 | A1 | * | 10/2003 | Ikeda ............................. 707/3 |
| 2004/0068486 | A1 | * | 4/2004  | Chidlovskii .................... 707/3 |
| 2004/0111678 | A1 | * | 6/2004  | Hara et al. ................... 715/526 |
| 2005/0240381 | A1 | * | 10/2005 | Seiler et al. ..................... 703/1 |
| 2006/0173617 | A1 | * | 8/2006  | Sladky et al. ................ 701/211 |
| 2006/0230031 | A1 | * | 10/2006 | Ikeda et al. ..................... 707/3 |
| 2007/0011150 | A1 | * | 1/2007  | Frank ............................. 707/4 |
| 2007/0282811 | A1 | * | 12/2007 | Musgrove ....................... 707/3 |
| 2007/0294240 | A1 | * | 12/2007 | Steele et al. ................... 707/5 |
| 2008/0082578 | A1 | * | 4/2008  | Hogue et al. ............. 707/104.1 |

FOREIGN PATENT DOCUMENTS

| JP | 11-224264   | 8/1999  |
| JP | 2002-117043 | 4/2002  |
| JP | 2003-281181 | 10/2003 |

(Continued)

OTHER PUBLICATIONS

European Search Report mailed Nov. 12, 2007, European Application No. 07252659.3-1225, 9 pages.

(Continued)

*Primary Examiner*—John E Breene
*Assistant Examiner*—Phong Nguyen
(74) *Attorney, Agent, or Firm*—Blakely, Sokoloff, Taylor & Zafman LLP

(57) ABSTRACT

When a search request is input, an initial search result that matches the search request is displayed to a user. When a seed document set is selected by the user from the initial search result, an extension word set is extracted from the seed document set. Using the extension word set in addition to the search request, another search is performed.

15 Claims, 9 Drawing Sheets

FOREIGN PATENT DOCUMENTS

| JP | 2004-348768 | 12/2004 |
|---|---|---|
| JP | 2005-056081 | 3/2005 |
| JP | 2005-092442 | 4/2005 |
| JP | 2005-215765 | 8/2005 |

OTHER PUBLICATIONS

Reiterer et al, "Insyder: a content-based visual-information-seeking system for WEB", International Journal on Digital Libraries, Springer-Verlag, BE, vol. 5, No. 1, Mar. 1, 2005, pp. 25-41, XP019352111, ISSN: 1432-1300.

Reiterer et al, "Insyder—An Information Assistant for Business Intelligence", Sigir 2000, Proceedings of the 23rd, Annual International ACM Sigir Conference on Research and Development in Information Retrieval, Athens, Greece, Jul. 24, 2000, vol. CONF. 23, pp. 112-119, XP000970721; ISSN: 1-58113-226-3.

Baeza-Yates R. et al., "Modern Information Retrieval", 1999, XP002456246, ISSN: 0-210-39829-X, 8 Pages.

Ruthven et al., "A Survey on the Use of Relevance Feedback for Information Access Systems", Knowledge Engineering Review, Cambridge University Press, GB, vol. 18, No. 2, Jun. 2003, pp. 1-54, XP002303989, ISSN: 0269-8889.

Heesch et al., "Relevance Feedback for Content-Based Image Retrieval: What Can Three Mouse Clicks Achieve?", Advances in Information Retrieval: 25th European Conference on IR Research, ECIR 2003, Pisa, Italy, Apr. 14, 2003, XP002456245;.

* cited by examiner

SEARCHING A DOCUMENT USING RELEVANCE FEEDBACK

PRIORITY

The present application claims priority to and incorporates by reference the entire contents of Japanese patent application No. 2006-196428, filed in Japan on Jul. 19, 2006.

FIELD OF THE INVENTION

Example embodiments of the present invention relate generally to an apparatus, method, system, computer program and product each capable of searching a document, and more specifically to an apparatus, method, system, computer program and product each capable of searching a document using relevance feedback.

DESCRIPTION OF THE RELATED ART

Today, various kinds of information are stored in the form of electronic data. In order to retrieve a desired document from a large amount of stored electronic documents, a user usually requests an information retrieval (IR) system to search through the stored documents for one or more documents that match a search request input by the user.

In order to improve accuracy in searching, one or more words that are determined to be relevant to the search request, which may be collectively referred to as an extension word set, may be used in addition to the search request. One approach to selecting the extension word set is to use the relevance feedback method. For example, the IR system retrieves one or more documents that match the search request input by the user as an initial search result. The retrieved documents are then classified into the documents that are relevant to the search request (collectively, referred to as the "seed document set"), and the documents that are irrelevant to the search request. Using the extension word set obtained from the seed document set in addition to the search request, the IR system performs another search.

When using the above-described relevance feedback method, the extension word set or the seed document set needs to be specified with accuracy while suppressing the workload of the user. For example, in order to improve accuracy in specifying the extension word set, Japanese Patent Application Publication No. 2002-117043 discloses a technique in which a word, which is previously determined to be unsuitable as the extension word, is excluded from a candidate of the extension word set. In another example, in order to help the user in specifying the seed document set, the initial search result may be displayed to the user in a manner such that the user can intuitively know the characteristics of each document obtained by the initial search, for example, using the technique described in the Japanese Patent Application Publication No. 2004-348768, 2005-092442, or 2005-056081.

While the technique disclosed in the Japanese Patent Application Publication No. 2002-117043 may be capable of improving accuracy in specifying the extension word set, the user may still need to previously determine an unsuitable word. While the technique described in any one of the Japanese Patent Application Publication Nos. 2004-348768, 2005-092442, and 2005-056081 may be used to help the user in specifying the seed document set, the user may still need to request the IR system to perform secondary search after specifying the seed document set.

SUMMARY

Searching a document using relevance feedback is described. In one embodiment a document search apparatus, comprising: a search request input to input a search request including a keyword set; a user interface to cause a display to display an initial search result to a user, where the initial search result comprises a first retrieved document set retrieved from a plurality of documents stored in a document database using the keyword set of the search result; an extension word extractor to extract an extension word set from a seed document set, where the seed document set is selected by the user from the first retrieved document set of the initial search result; and a database manager to search through the plurality of documents stored in the document database for a second retrieved document set using the keyword set of the search request and the extension word set.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
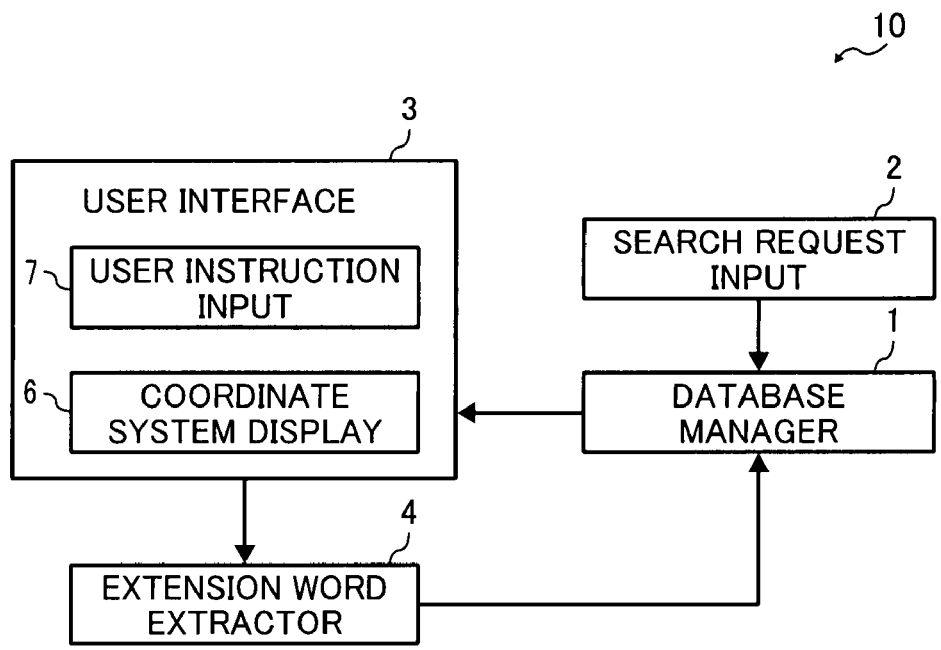
FIG. 1 is a block diagram illustrating a functional structure of a document search apparatus according to an example embodiment of the present invention.

Example embodiments of the present invention include an apparatus, method, system, computer program and product, each capable of searching a document using relevance feedback while suppressing the workload of the user.

In one example, a document search apparatus may be provided, which includes a search request input, a user interface, an extension word extractor, and a database manager. The search request input inputs a search request including a keyword set. The user interface causes a display to display an initial search result to a user, which includes a first retrieved document set retrieved from a plurality of documents stored in a document database using the keyword set of the search result. The extension word extractor extracts an extension word set from a seed document set, which is selected by the user from the first retrieved document set of the initial search result. The database manager searches through the plurality of documents stored in the document database for a second retrieved document set using the keyword set of the search request and the extension word set.

In another example, a document search system may be provided, which includes a client apparatus and a server apparatus. When a search request including a keyword set is received from the client apparatus, the server apparatus retrieves a first retrieved document set from a plurality of documents stored in a document database using the keyword set of the search result, and send an initial search result including information regarding the first retrieved document set to the server apparatus for display to a user. When information regarding a seed document set selected by the user from the first retrieved document set is received from the client apparatus, the server apparatus extracts an extension word set from the seed document set, and searches through the plurality of documents for a second retrieved document set using the keyword set of the search request and the extension word set.

In another example, a document search method may be provided, which includes: inputting a search request including a keyword set; searching through a plurality of documents stored in a document database for one or more first retrieved documents that match the keyword set of the search request to obtain an initial search result; displaying the initial search result to a user; selecting one or more seed documents as a seed document set from the one or more first retrieved documents according to a user instruction performed on the initial search result being displayed; extracting an extension word set from the seed document set; and searching through the plurality of documents stored in the document database for one or more second retrieved documents that match the keyword set of the search request and the extension word set. For example, the initial search result may include a document identifier, a relevance value, and at least one attribute value for each one of the one or more first retrieved documents.

In addition to the above-described examples, the present invention may be implemented in various other ways, for example, as a computer program, which causes any general-purpose computer to function as the document search apparatus described above or below.

In describing the example embodiments illustrated in the drawings, specific terminology is employed for clarity. However, the disclosure of this patent specification is not intended to be limited to the specific terminology selected and it is to be understood that each specific element includes all technical equivalents that operate in a similar manner. For example, the singular forms "a", "an" and "the" are intended to include the plural forms as well, unless the context clearly indicates otherwise.

Referring now to the drawings, wherein like reference numerals designate identical or corresponding parts throughout the several views, FIG. 1 illustrates an a document search apparatus 10 according to an example embodiment of the present invention.

The document search apparatus 10 includes a database manager 1, a search request input 2, a user interface 3 including a coordinate system display 6 and a user instruction input 7, and an extension word extractor 4. The database manager 1, which may be implemented by a database kernel, manages a plurality of electronic documents stored in a document database. The search request input 2 inputs a search request which includes a character string, such as one or more words or sentences selected by a user for document search. For the descriptive purpose, the character string selected by the user may be collectively referred to as a keyword set. The extension word extractor 4 extracts one or more words that are relevant to the search request as an extension word set. The user interface 3 outputs a search result, which is obtained by the database manager 1 using the keyword set of the search request and/or the extension word set extracted by the extension word extractor 4. The user interface 3 may include the coordinate system display 6, which displays the search result on a coordinate system. The user interface 3 may further include the user instruction input 7, which inputs a user instruction performed in relation to the search result displayed on the coordinate system display 6.

Figure 2:
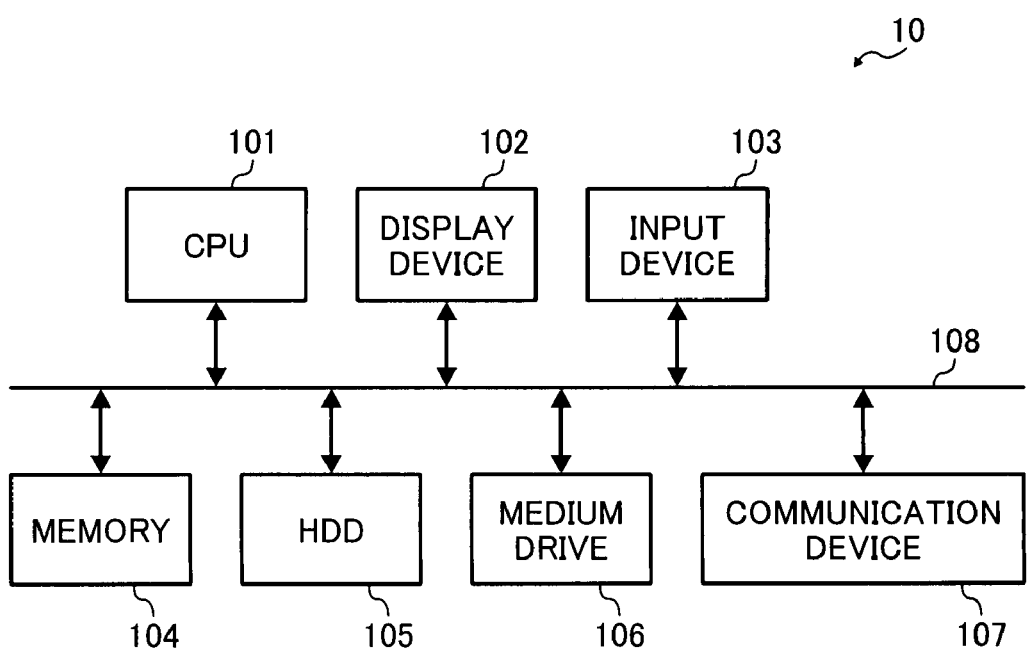
FIG. 2 is a block diagram illustrating a hardware structure of a document search apparatus according to an example embodiment of the present invention.

The document search apparatus 10 may be implemented by any desired apparatus capable of managing data, such as an information processing apparatus having a structure illustrated in FIG. 2. Referring to FIG. 2, the document search apparatus 10 includes a central processing unit (CPU) 101, a display device 102, an input device 103, a memory 104, a hard disk drive (HDD) 105, a medium drive 106, and a communication device 107, which are connected through a bus 108.

The CPU 101 controls operation of the document search apparatus 10, for example, according to a control program stored in the memory 104. More specifically, the CPU 101 may function as the database manager 1, the search request input 2, the user interface 3, and the extension word extractor 4 respectively shown in FIG. 1.

The display device 102 may display various information to the user under control of the CPU 101 such that it may function as the user interface 3 having the coordinate system display 6 (FIG. 1). The display device 102 may be implemented by any desired display, such as a liquid crystal display (LCD), etc. The input device 103 may allow the user to input a user instruction under control of the CPU 101 such that it may function as the search request input 2 or the user interface 3 having the user instruction input 7. The input device 103 may be implemented by, for example, a keyboard, a pointing device, a key, a button, etc. Alternatively, the functions of the display device 102 and the input device 103 may be incorporated into one device, for example, as a touch panel screen having a graphical user interface.

The memory 104 may store various data including the control program. Alternatively, the memory 104 may function as a work area of the CPU 101. The HDD 105 is capable of storing a large amount of data such that it may function as the document database storing the plurality of documents. The medium drive 106 is capable of reading or writing data from or onto a recording medium.

The communication device 107 allows the document search apparatus 10 to communicate with the outside through a network. For example, when the document search apparatus 10 functions as a server that communicates with a client, the document search apparatus 10 receives the search request through the communication device 107 from the client, and causes the CPU 101 to search according to the search request. After performing the search, the document search apparatus 10 outputs the search result through the communication device 107 to the client. In such case, a display device of the client may function as the coordinate system display 6, while an input device of the client may function as the user instruction input 7.

As described above, the control program may be stored in the memory 104. Alternatively, the control program may be read from the HDD 105, the recording medium through the medium drive 106, or the outside apparatus through the communication device 107.

Further, in this example, the devices of FIG. 1 may be incorporated into one apparatus as illustrated in FIG. 2. Alternatively, the devices of FIG. 1 may be incorporated into more than one apparatus, for example, to create a document search system including a client apparatus and a server apparatus connected via a network. In one example of the document search system, the search request input 2, the user interface 3 including the user instruction input 7 and the coordinate system display 6, and the extension word extractor 4 may be incorporated into the client apparatus. The database manager 1 may be incorporated into the server apparatus.

Referring back to FIG. 1, in one example operation, the document search apparatus 10 performs searching using the relevance feedback method. In this example, the search request input 2 allows the user to input the keyword set through the user interface 3. When a sentence is input, one or more words may be extracted from the sentence using the known syntactic analyzing method. Once the keyword set is input, the search request input 2 sends a search request including the keyword set input by the user to the database manager 1.

The database manager 1 retrieves one or more documents ("the first retrieved documents") each including the keyword set included in the search request as an initial search result. At this time, for each one of the first retrieved documents, the relevance value indicating the degree of relevance between the first retrieved document and the search request is obtained using any known method. For example, the relevance value of the first retrieved document may be obtained as a score S as described below.

Assuming that the user inputs a term t as the keyword set, the weighting factor Wt of the term t is calculated using the number of searched documents N, the number of first retrieved documents n, and adjusting parameters k1 and k2, as described in the following equation:

$$Wt = \log(k1 * N/n + k2).$$

In this example, the number of searched documents N may correspond to the number of the plurality of electronic documents stored in the document database. Further, in this example, the parameters k1 and k2 may be preferably used to adjust the change in weighting factor Wt relative to the change in number of first retrieved documents n.

The score S, which may be used as the relevance value, is calculated for each one of the first retrieved documents using the weighting factor Wt of the term t, the frequency tf indicating the occurrence frequency of the term t in the first retrieved document, and an adjusting parameter k1, as described in the following equation:

$$S = Wt * tf/k0 + tf.$$

In this example, the parameter k0 may be preferably used to adjust the frequency tf in relation to the length of the first retrieved document. When more than one term t is included as the keyword set of the search request, the score S of the first retrieved document may be obtained as the sum of the scores S for all the terms t included in the search request.

Further, in this example, at least one attribute value may be obtained for each one of the first retrieved documents in addition to the relevance value. The attribute value may be any desired kind of information relating to the first retrieved document, for example, the date of publishing or creation, document size, document title, document type, author name, etc., which may be selected by default or according to the user preference. The attribute value of one or more kinds may be previously stored in the document database in a corresponding manner with identification information for each one of the plurality of electronic documents.

The database manager 1 outputs a document identifier, a relevance value, and one or more attribute values to the user interface 3 for each one of the first retrieved documents, as the initial search result. Upon receiving the initial search result, the user interface 3 sends the initial search result to the coordinate system display 6, for example, as described referring to FIG. 3. For simplicity, one attribute value is obtained for each one of the first retrieved documents.

Figure 3:
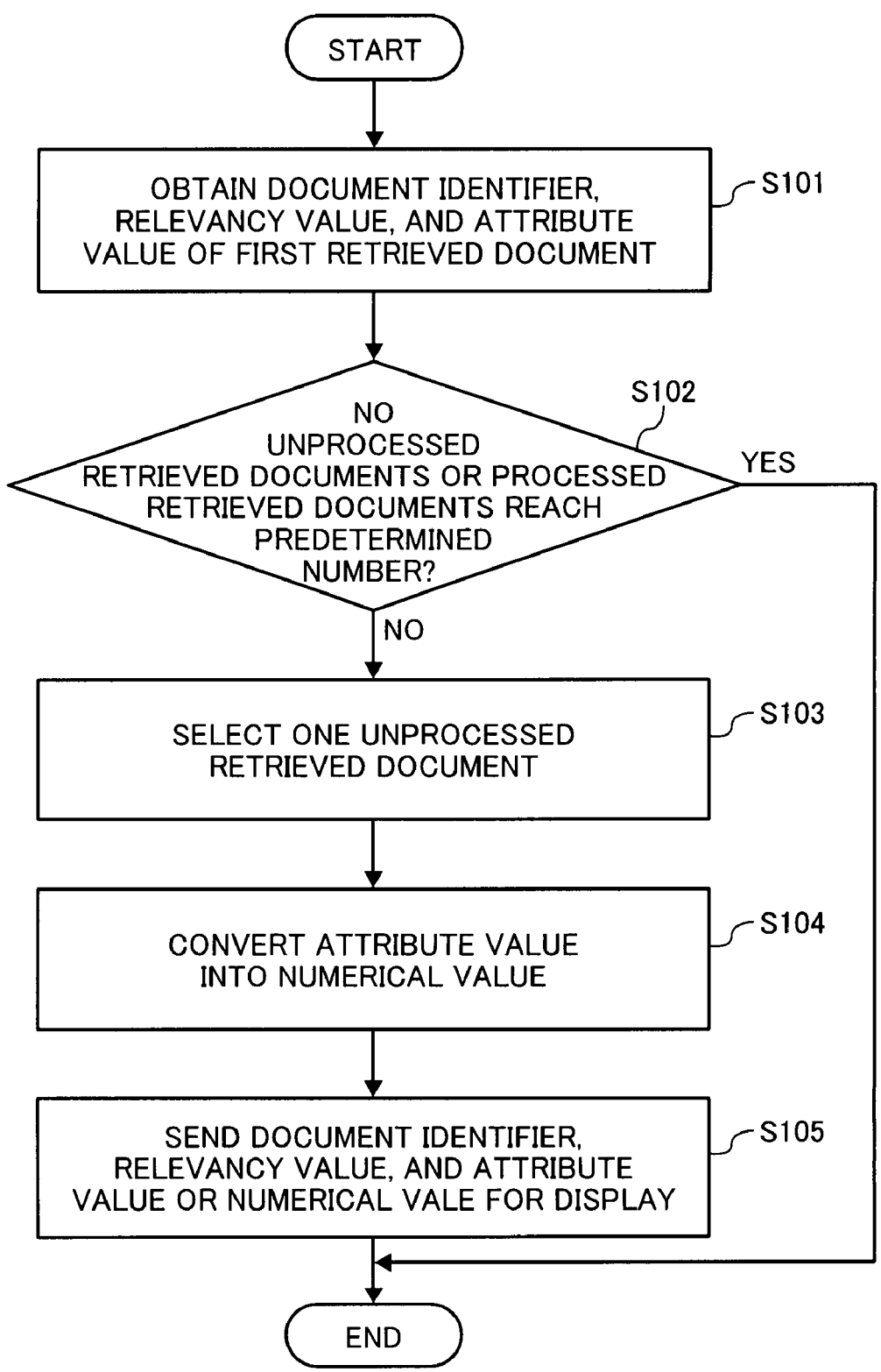
FIG. 3 is a flowchart illustrating operation of outputting an initial search result, performed by the document search apparatus of FIG. 1, according to an example embodiment of the present invention.

Referring to FIG. 3, S101 obtains the document identifier, the relevance value, and the attribute value for each one of the first retrieved documents from the database manager 1.

S102 determines whether all first retrieved documents are processed, or the number of processed first retrieved documents reaches a predetermined number. When all first retrieved documents are processed or the number of processed first retrieved documents reaches the predetermined number ("YES" at S102), the operation ends. When at least one first retrieved document is not processed or the number of processed first retrieved documents is less than the predetermined number ("NO" at S102), the operation proceeds to S103.

S103 selects one first retrieved document from the first retrieved documents as a selected first retrieved document.

S104 obtains a numerical value that corresponds to the attribute value of the selected first retrieved document. S104 may be performed when the attribute value is not expressed in the form of numerical value such that the attribute value cannot be used to determine a rank or an order of the first retrieved document relative to the other first retrieved documents in the first retrieved document set. For example, if the document title is used as the attribute value, the document title, which is character data, may be converted to the byte sequence consisting of a plurality of integers. The plurality of integers may be added, after being multiplied by one or more coefficients, into one numerical value.

S105 sends the document identifier, the relevance value, and the attribute value or the numerical value to the coordinate system display 6.

S103 to S105 are repeated until all first retrieved documents are processed or the number of processed first retrieved documents reaches the predetermined number. For example, when the number of first retrieved documents are relatively large, the document search apparatus 10 may restrict the number of first retrieved documents such that a predetermined number of the first retrieved documents having high relevance values are sent to the coordinate system display 6.

Figure 4:
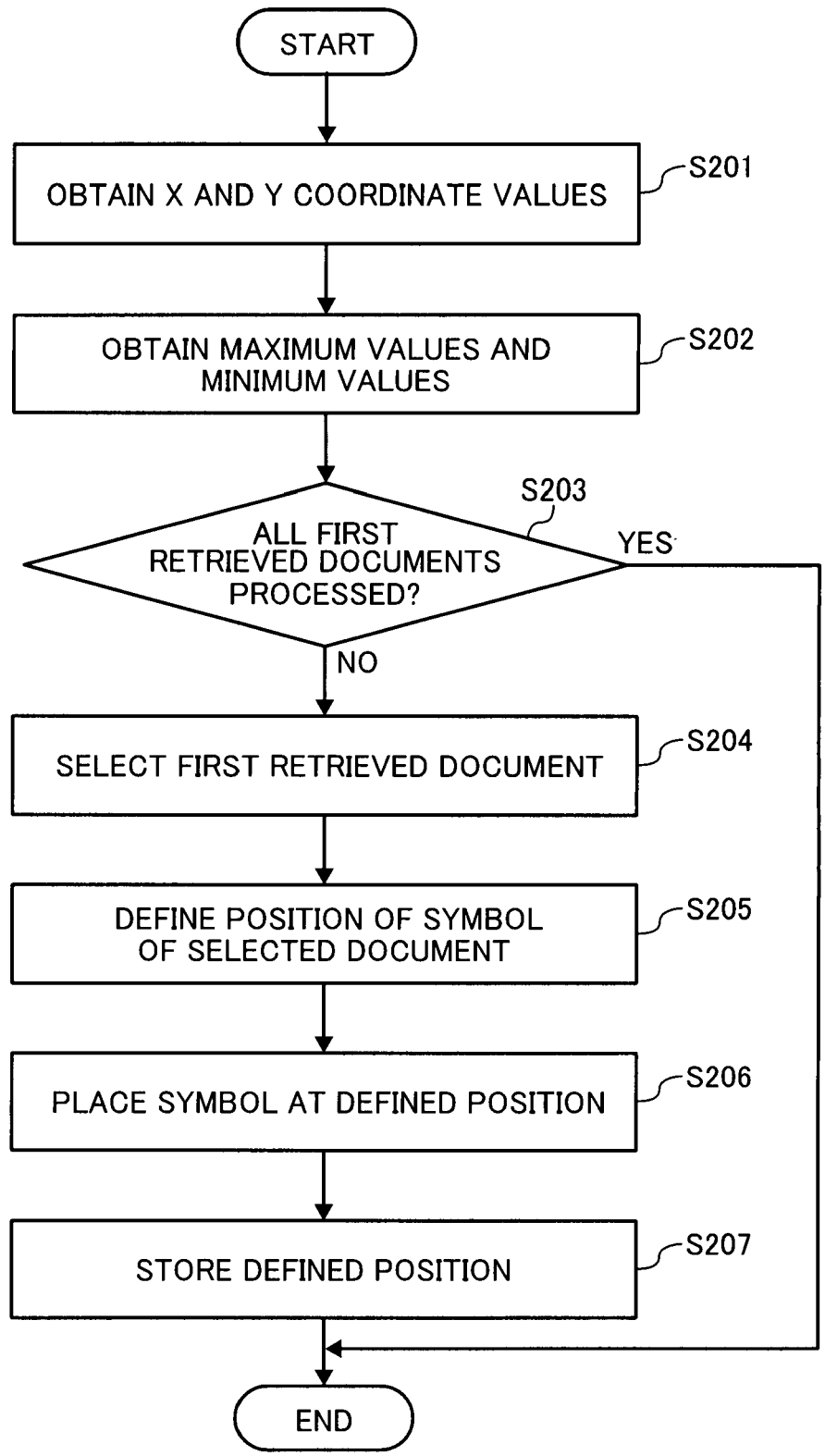
FIG. 4 is a flowchart illustrating operation of displaying an initial search result, performed by the document search apparatus of FIG. 1, according to an example embodiment of the present invention.
Figure 5:
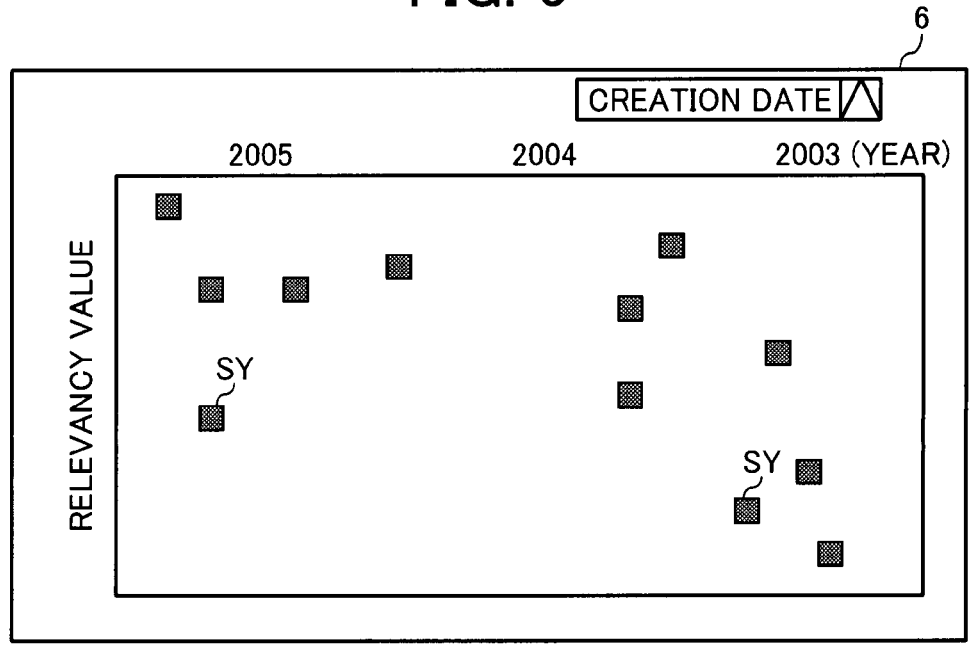
FIG. 5 is an illustration of an example screen displayed by the document search apparatus of FIG. 1.

Once the document identifier, the relevance value, and the attribute value or its numerical value are obtained from the user interface 3, the coordinate system display 6 displays the initial search result on the coordinate system, for example, as described referring to FIG. 4. In this example, as illustrated in FIG. 5, each first retrieved document is expressed in the form of symbol ("SY"), located at the position defined by the XY coordinate values. The Y coordinate value corresponds to the relevance value, which may be expressed by the score S, of the first retrieved document. The X coordinate value corresponds to the attribute value, which may be the creation date in this example, of the first retrieved document.

Referring back to FIG. 4, at S201, the coordinate system display 6 obtains the X coordinate value and the Y coordinate value for each one of the first retrieved documents.

S202 obtains the maximum value and the minimum value for each one of the X and Y coordinate values. In this example, the maximum and minimum Y coordinate values respectively correspond to the maximum and minimum relevance values obtained from the initial search result. The maximum and minimum X coordinate values respectively correspond to the maximum and minimum attribute values, or numerical values, obtained from the initial search result.

S203 determines whether all first retrieved documents are processed. When all first retrieved documents are processed ("YES" at S203), the operation ends. When at least one first retrieved document is not processed ("NO" at S203), the operation proceeds to S204.

S204 selects one first retrieved document, and obtains the XY coordinate values for the selected first retrieved document.

S205 defines a position of the symbol SY of the selected first retrieved document in the coordinate system, by normalizing the XY coordinate values of the selected first retrieved document using the maximum and minimum XY coordinate values obtained at S202. Specifically, the normalized Y coordinate value of the selected document may be expressed as {(relevance value of the selected document)−(minimum relevance value)}/{(maximum relevance value)−(minimum relevance value)}. The normalized X coordinate value of the selected document may be expressed as {(attribute or numerical value of the selected document)−(minimum attribute or numerical value)}/{(maximum attribute or numerical value)−(minimum attribute or numerical value)}. In this manner, the position of the symbol SY may be expressed as the number between 0 and 1.

S206 places the symbol SY at the position defined at S205, for example, as illustrated in FIG. 5.

S207 stores information regarding the position of the symbol SY in a corresponding manner with the document identifier of the selected first retrieved document, using the known associative memory model.

S204 to S207 are repeated until all first retrieved documents are processed.

In the above-described example referring to FIG. 4 or 5, the initial search result is displayed on the two-dimensional coordinate system. Alternatively, when more than one attribute values or the corresponding numerical values are obtained for each one of the first retrieved documents, the initial search result may be displayed on the three-dimensional coordinate system. Further, the type of coordinate system may not be limited to the Cartesian coordinate system illustrated in FIG. 5. For example, the polar coordinate system may be used in alternative to the Cartesian coordinate system. When the polar coordinate system is used, the relevance value may correspond to the radial coordinate value. In this manner, the user may easily recognize the characteristics of each first retrieved document.

Figure 8:
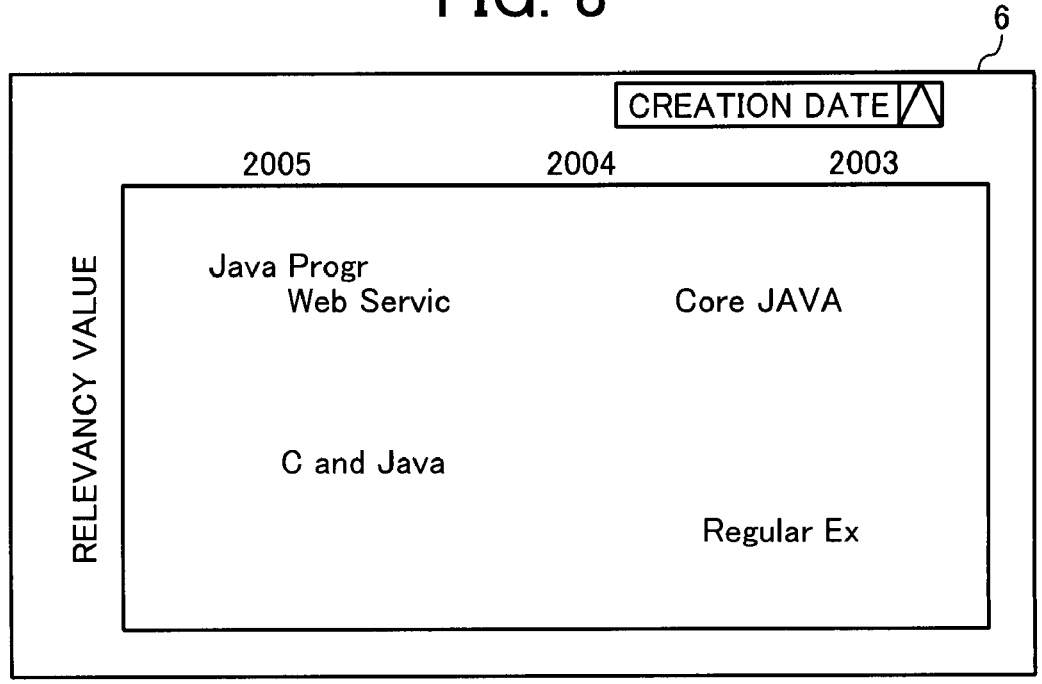
FIG. 8 is an illustration of an example screen displayed by the document search apparatus of FIG. 1.

Further, the above-described operation described referring to FIGS. 3 and 4 may be performed in various other ways. For example, instead of displaying the symbol "SY" in the form of square as shown in FIG. 5, the symbol "SY" may be displayed in the form of character string, which may be derived from information regarding the first retrieved document as shown in FIG. 8. Referring to FIG. 8, the character string of the symbol SY corresponds to a portion of document title of the first retrieved document, which may be obtainable from the document database of the database manager 1.

In such case, referring to FIG. 3, the user interface 3 additionally obtains the document title of each one of the first retrieved documents from the document database through the database manager 1. The user interface 3 additionally sends the document title of each one of the first retrieved documents to the coordinate system display 6.

Referring to FIG. 4, the coordinate system display 6 displays the symbol SY in the form of character string derived from the document title, as illustrated in FIG. 8. In this example, the length of the character string is previously determined to be 10 character-long. In this manner, the symbol SY may provide the user with information, which may be useful in determining the quality of the initial search result, or selecting a seed document set.

Once the initial search result is displayed to the user through the coordinate system display 6, the user may select one or more first retrieved documents from the initial search result that match the search request, for example, using the input device 103 (FIG. 2). Upon detecting the user instruction performed on the coordinate system through the user instruction input 7, the user interface 3 selects one or more first retrieved documents according to the user instruction as a seed document set, and sends information regarding the seed document set to the extension word extractor 4, for example, as described referring to FIG. 6.

Figure 6:
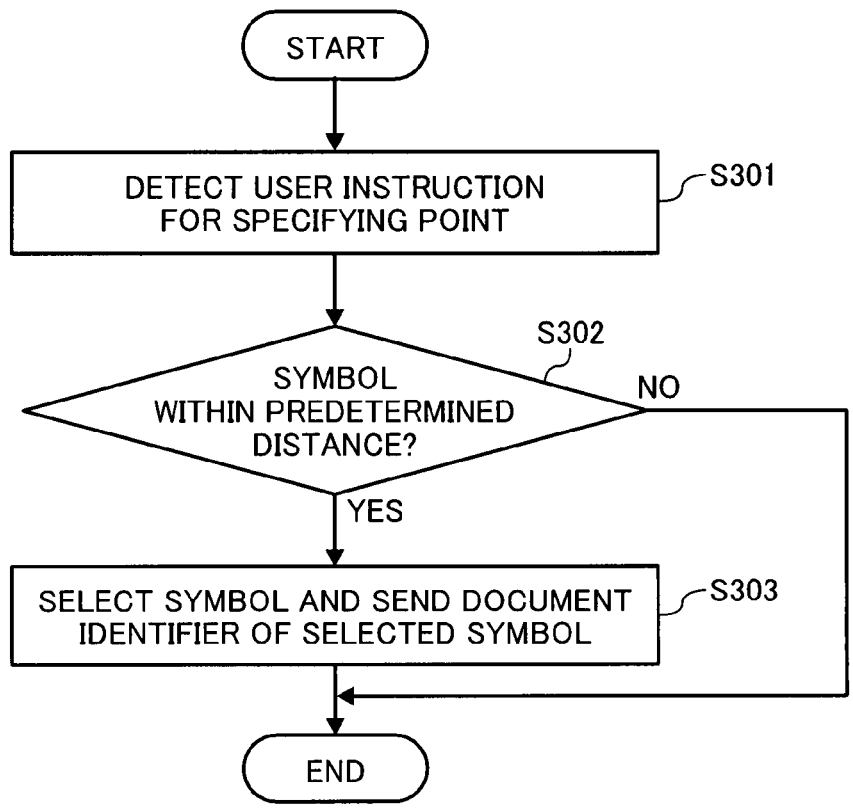
FIG. 6 is a flowchart illustrating operation of specifying a seed document set selected by a user, performed by the document search apparatus of FIG. 1, according to an example embodiment of the present invention.

Referring to FIG. 6, S301 detects a user instruction for specifying a point on the coordinate system being displayed on the coordinate system display 6, for example, through the user instruction input 7. In one example, the user may click any point on the coordinate system using a pointing device. In another example, the user may directly touch any point on the screen being displayed on the coordinate system display 6 with a finger or the pointing device.

S302 determines whether one or more symbols are located within a predetermined distance from the specified point on the coordinate system. If one or more symbols are located ("YES" at S302), the operation proceeds to S303. If no symbols are located ("NO" at S302), the operation ends.

S303 selects at least one symbol that is determined to be within the predetermined distance, sends identification information of the first retrieved document represented by the selected symbol to the extension word extractor 4, and the operation ends. In this example, the document identifier may be used as the identification information. Further, in this example, any number of symbols may be selected. For example, only one symbol that is located closest to the specified point may be selected as a seed document. Alternatively, a plurality of symbols that are located within the predetermined distance from the specified point may be selected as a seed document set.

Figure 7:
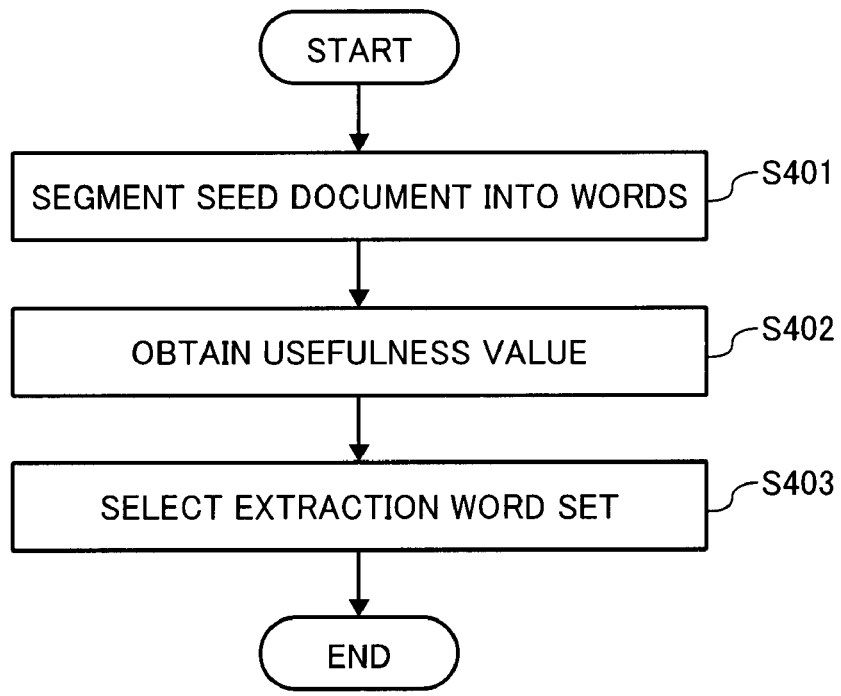
FIG. 7 is a flowchart illustrating operation of extracting an extension word set, performed by the document search apparatus of FIG. 1, according to an example embodiment of the present invention.

Once information regarding the seed document set is obtained, the extension word extractor 4 extracts an extension word set from the seed document set, for example, as described referring to FIG. 7.

S401 segments each seed document into a plurality of words, for example, using any desired method such as the morphological analysis method.

S402 obtains the usefulness value of each word obtained at S401. In this example, the usefulness value, which indicates the degree of usefulness of a word w in document search, may be obtained as the occurrence frequency of the word w, which is the number of seed documents each including the word w.

Alternatively, any other suitable value may be used to indicate the usefulness of the word w. In another example, the extension word extractor 4 may obtain the relevance value of each one of the seed documents, and use the relevance value as a weighting factor of each one of the seed documents. For example, the usefulness value of the word w may be obtained by the occurrence frequency multiplied by the weighting factor. In this manner, the usefulness value of the word w included in the seed document having a high relevance value may become greater than the usefulness value of the word w included in the seed document having a low relevance value.

In another example, the extension word extractor 4 may previously classify the first retrieved documents into one or more groups according to the relevance values, and assign a weighting factor to each one of the groups. In this manner, the workload of the document search apparatus 10 may be reduced.

Further, at S402, any word that may be inappropriate for the search request may be excluded even when the word may have high occurrence frequency. For example, the word that may be not be useful in document search, such as the article "a", "an", or "the", the conjunctive adverb such as "then" or "however", etc., may be excluded from a candidate of the extension word set.

S403 extracts one or more words as an extension word set using the usefulness value, sends the extracted extension word set to the database manager 1, and the operation ends. For example, a predetermined number of words having the highest usefulness values are selected to be included in the extension word set. In this example, the predetermined number of extension words to be included in the extension word set may be previously determined by default or according to the user preference.

Upon receiving the extension word set, the database manager 1 searches through the document database for one or more documents ("second retrieved documents") each including the extension word set in addition to the keyword set included in the search request. The second retrieved documents are output to the user interface 3 as a second search result for display to the user in a substantially similar manner as described above referring to the example case of displaying the initial search result.

As described above referring to FIGS. 6 and 7, upon detecting a user instruction performed in relation to the initial search result, the document search apparatus 10 performs secondary search based on feedback information obtainable from the user instruction. In this manner, the document search apparatus 10 may improve the quality of search result. Further, the document search apparatus 10 may repeat the above-described searching operation until the user is satisfied with the search result.

The above-described operation of searching a document may be performed in various other ways.

Figure 9:
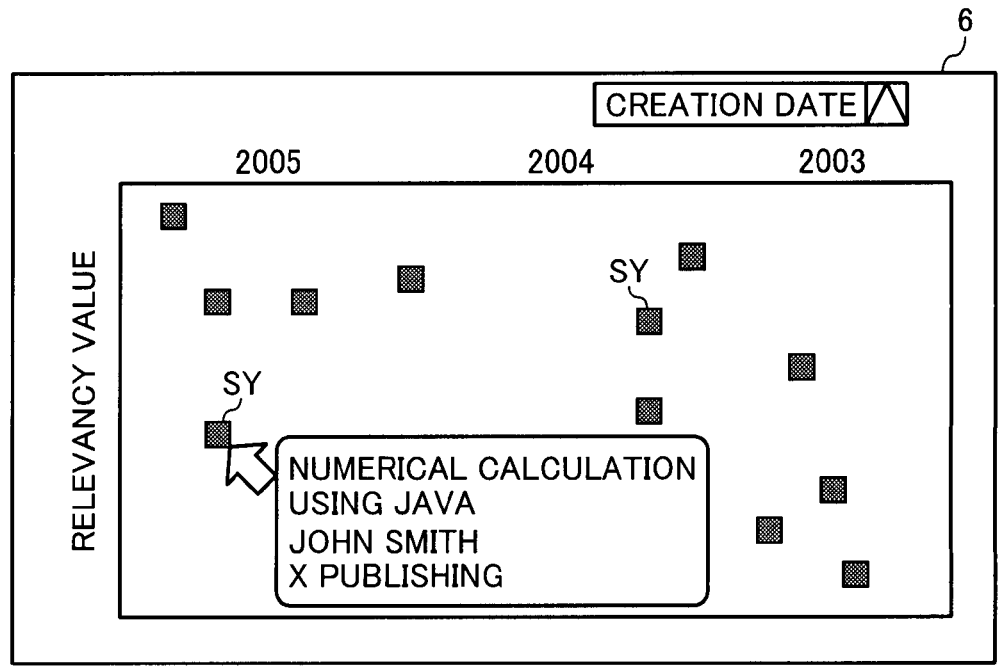
FIG. 9 is an illustration of an example screen displayed by the document search apparatus of FIG. 1.

In one example, in order to further facilitate operation of selecting a seed document set, the document search apparatus 10 may display additional information to the user upon detecting a user instruction for requesting such information. For example, as illustrated in FIG. 9, after the initial search result is displayed on the coordinate system display 6, the user may place the cursor of the pointing device (indicated by the arrow in FIG. 9) at a specific point on the coordinate system for a predetermined time period. At this time, the cursor is assumed to be placed near a symbol SY selected by the user. Upon detecting the above-described user instruction performed on the coordinate system through the user instruction input 7, the document search apparatus 10 causes the coordinate system display 6 to display a window including additional information regarding the first retrieved document that corresponds to the selected symbol SY, for example, as descried referring to FIG. 10.

Figure 10:
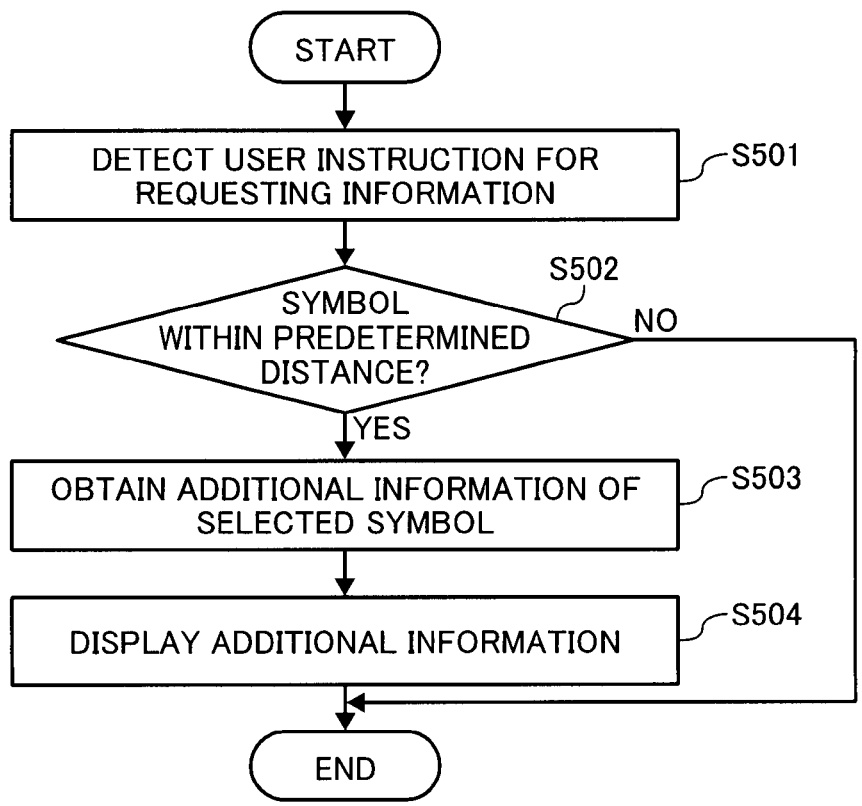
FIG. 10 is a flowchart illustrating operation of displaying additional information regarding an initial search result, performed by the document search apparatus of FIG. 1, according to an example embodiment of the present invention.

Referring to FIG. 10, S501 detects a user instruction for requesting additional information regarding a first retrieved document selected by the user, for example, through the user instruction input 7. As described above referring to FIG. 9, the user instruction for requesting addition information may be detected when the user places the cursor of the pointing device at a specific point on the coordinate system for a predetermined time period, using the input device 103 (FIG. 2). In another example, the user may directly touch any point on the screen being displayed on the coordinate system display 6 with a finger or the pointing device.

S502 determines whether one or more symbols are located within a predetermined distance from the specified point on the coordinate system. If one or more symbols are located ("YES" at S502), the operation proceeds to S503. If no symbols are located ("NO" at S502), the operation ends.

S503 selects at least one symbol that is determined to be located within the predetermined distance, obtains identification information of the first retrieved document represented by the selected symbol, and retrieves additional information corresponding to the first retrieved document from the document database. In this example, the document identifier may be used as the identification information. Further, in this example, any number of symbols may be selected. For example, only one symbol that is located closest to the specified point may be selected.

S504 displays the additional information of the selected first retrieved document obtained at S503. For example, as illustrated in FIG. 9, the additional information may be displayed in a separate window provided near the specified point on the coordinate system. In this example shown in FIG. 9, the document title, the author name, and the publisher name are displayed as the additional information. Alternatively, any other kind of information regarding the first retrieved document may be displayed.

Figure 11:
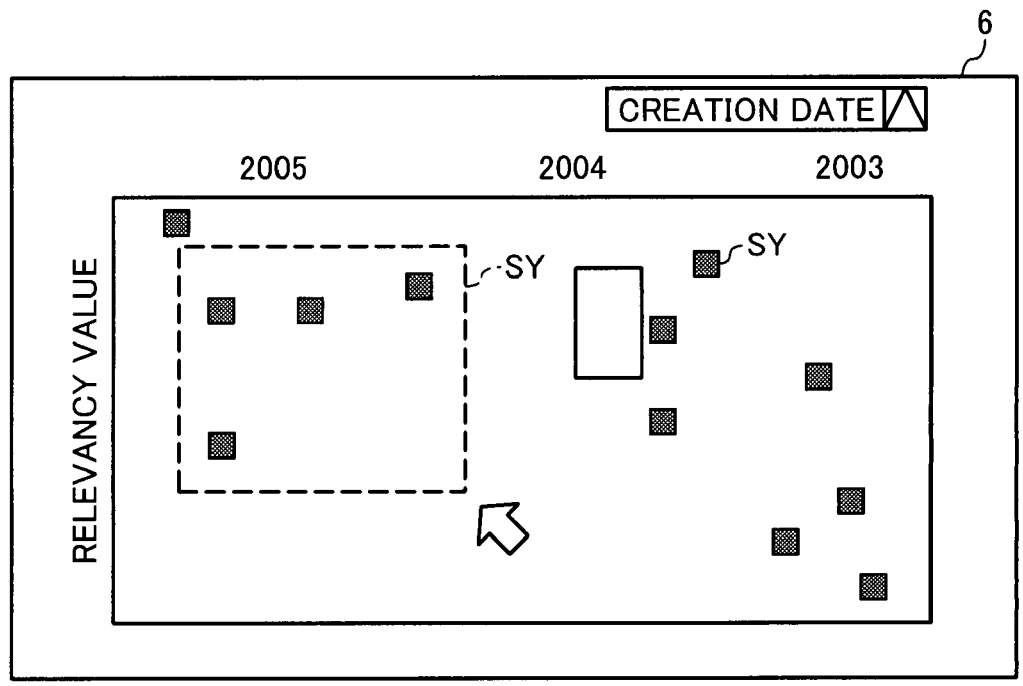
FIG. 11 is an illustration of an example screen displayed by the document search apparatus of FIG. 1.

In another example, in order to further facilitate operation of selecting a seed document set, the document search apparatus 10 may allow the user to easily select a plurality of seed documents, for example, by specifying at least two points on the coordinate system as illustrated in FIG. 11 using the input device 103 (FIG. 2). Upon detecting the user instruction performed on the coordinate system through the user instruction input 7, the user interface 3 selects more than one first retrieved document according to the user instruction as a seed document set, and sends information regarding the seed document set to the extension word extractor 4, for example, as described referring to FIG. 12.

Figure 12:
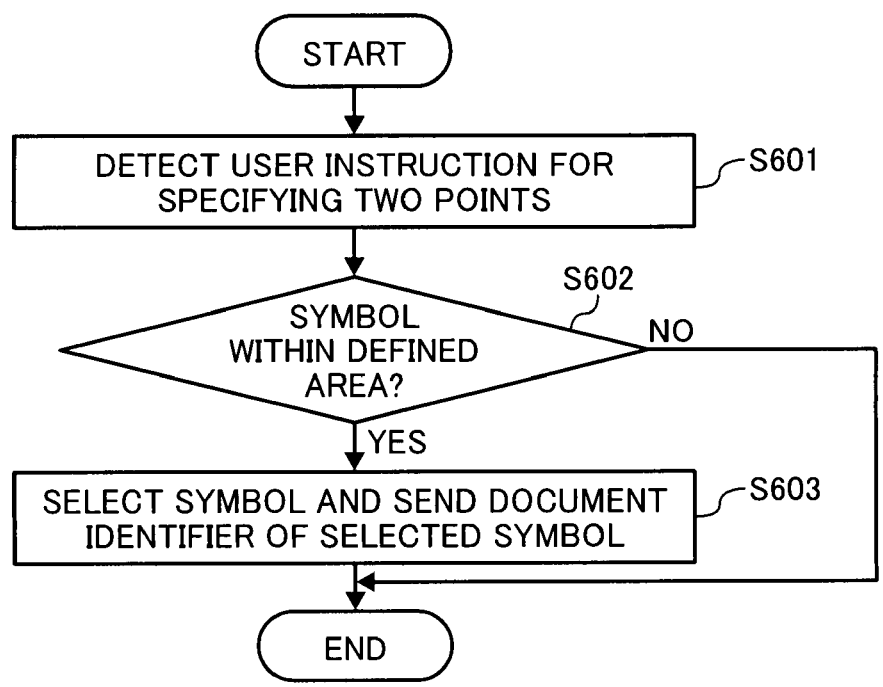
FIG. 12 is a flowchart illustrating operation of specifying a seed document set selected by a user, performed by the document search apparatus of FIG. 1, according to an example embodiment of the present invention.

Referring to FIG. 12, S601 detects a user instruction for specifying at least two points on the coordinate system being displayed on the coordinate system display 6, for example, through the user instruction input 7. In one example, the user may click any two points on the coordinate system using a pointing device. In another example, the user may directly touch any two points on the screen being displayed on the coordinate system display 6 with a finger or the pointing device.

S602 determines whether one or more symbols are located within an area specified by the specified points on the coordinate system. In this example, as illustrated in FIG. 11, the rectangular area is defined by the specified points. Alternatively, the area may have any shape other than the rectangular shape, for example, a circle having a radius defined by the two specified points. If one or more symbols are located ("YES" at S602), the operation proceeds to S603. If no symbols are located ("NO" at S602), the operation ends.

S603 selects the one or more symbols that are determined to be within the area, sends identification information of the first retrieved documents represented by the one or more selected symbols to the extension word extractor 4, and the operation ends. In this example, the document identifier may be used as the identification information.

Once information regarding the seed document set is obtained, the extension word extractor 4 extracts an extension word set from the seed document set, for example, as described above referring to FIG. 7.

In another example, the user may change the relevance value of any one of the first retrieved documents being displayed on the coordinate system display 6, by changing the position of the corresponding one of the symbol SY using the input device 103 (FIG. 2). Upon detecting such user instruction through the user instruction input 7, the document search apparatus 10 updates the relevance value according to the user instruction, for example, as described referring to FIG. 13.

Figure 13:
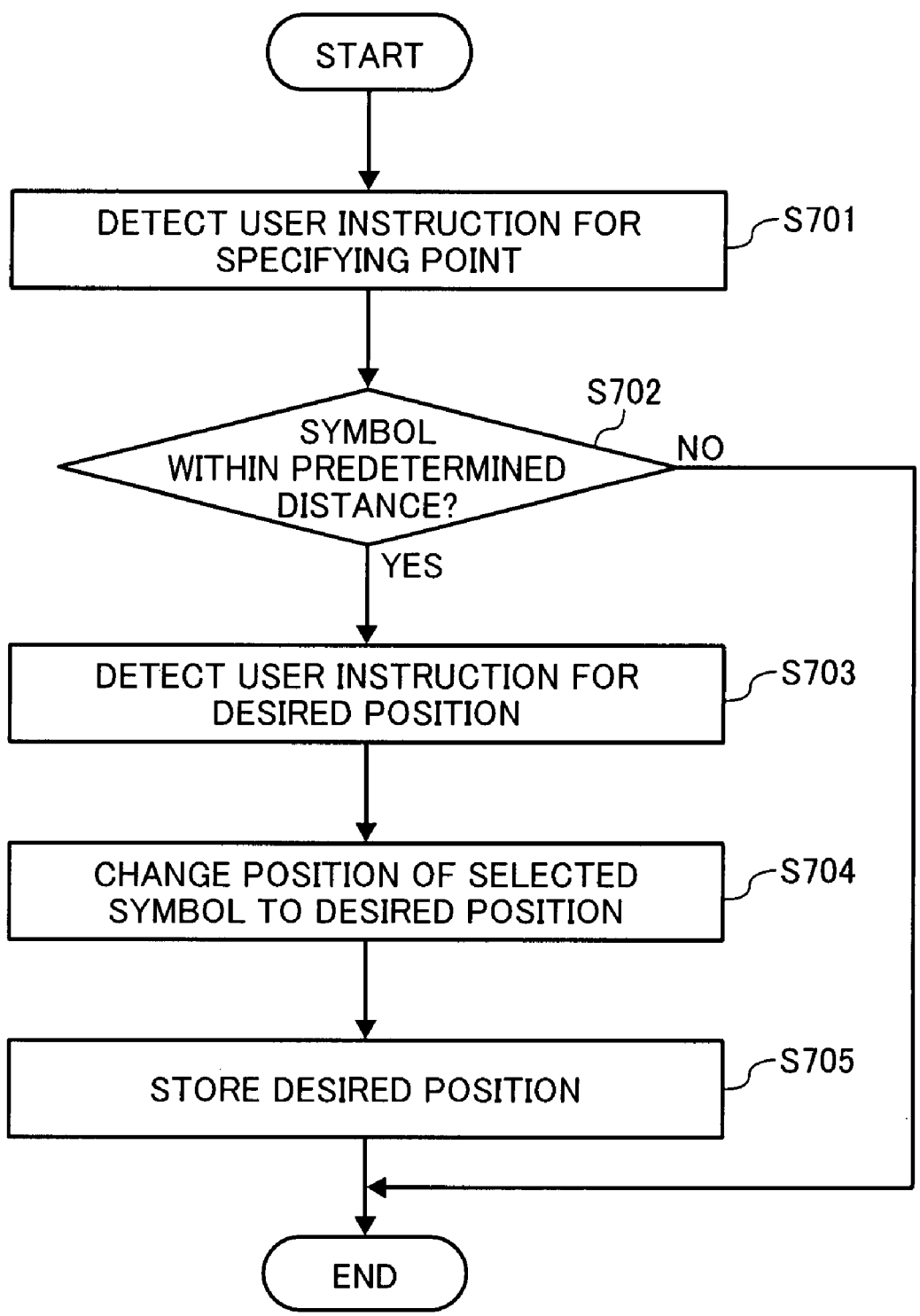
FIG. 13 is a flowchart illustrating operation of updating the relevance value of a first retrieved document, performed by the document search apparatus of FIG. 1, according to an example embodiment of the present invention.

Referring to FIG. 13, S701 detects a user instruction for specifying a point on the coordinate system being displayed on the coordinate system display 6, for example, through the user instruction input 7, in a substantially similar manner as described above referring to S301 of FIG. 6.

S702 determines whether one or more symbols SY are located within a predetermined distance from the specified point on the coordinate system. If one or more symbols are located ("YES" at S702), the operation proceeds to S703. If no symbols are located ("NO" at S702), the operation ends.

S703 selects one symbol SY that is determined to be within the predetermined distance. When more than one symbol is detected at S702, the symbol SY that is located closest to the specified point may be selected. S703 further detects a user instruction for changing the relevance value of a first retrieved document represented by the selected symbol SY. For example, the user may specify a desired position of the symbol SY on the coordinate system using the input device 103 (FIG. 2), such as the pointing device or the keyboard. Alternatively, the user may specify the desired position of the symbol SY on the coordinate system with the finger.

S704 changes the position of the selected symbol SY to the desired position obtained at S703.

S705 stores information regarding the desired position of the symbol SY in a corresponding manner with the document identifier of the selected first retrieved document, using the known associative memory model, for example, in a substantially similar manner as described above referring to S207 of FIG. 4.

In this manner, the relevance value, which is automatically obtained by the document search apparatus 10, may be changed according to the user preference. This may improve the quality of search result. For example, when the relevance value of the first retrieved document is changed as described above referring to FIG. 13, the updated relevance value may be sent to the extension word extractor 4 together with the document identifier corresponding to the updated relevance value. Based on the updated relevance value, which may be used as the updated weighting factor, the extension word extractor 4 may calculate the usefulness value of the word w, and extract an extension word set based on the usefulness value of the word w, for example, in a substantially similar manner as described above referring to FIG. 7.

In another example, the document search apparatus 10 may classify the first retrieved documents obtained as the initial search result into one or more groups according to the relevance values, and assigns a weighting factor to each group. When the relevance value of at least one of the first retrieved document is changed, for example, as described above referring to FIG. 13, the weighting factor assigned to the group to which the first retrieved document having the updated relevance value belongs may be sent to the extension word extractor 4. This may reduce the workload of the user in specifying the desired position or the workload of the document search apparatus 10 in re-calculating the weighting factor based on the updated relevance value.

In another example, the document search apparatus 10 may allow the user to select one or more types of attribute value through the input device 103 (FIG. 2). For example, after the initial search result is being displayed on the coordinate system display 6, the user may change the type of the attribute value for display. Upon detecting such user instruction for selecting the attribute value type through the user instruction input 7, the document search apparatus 10 may change the appearance of the initial search result, for example, as described referring to FIG. 14.

Figure 14:
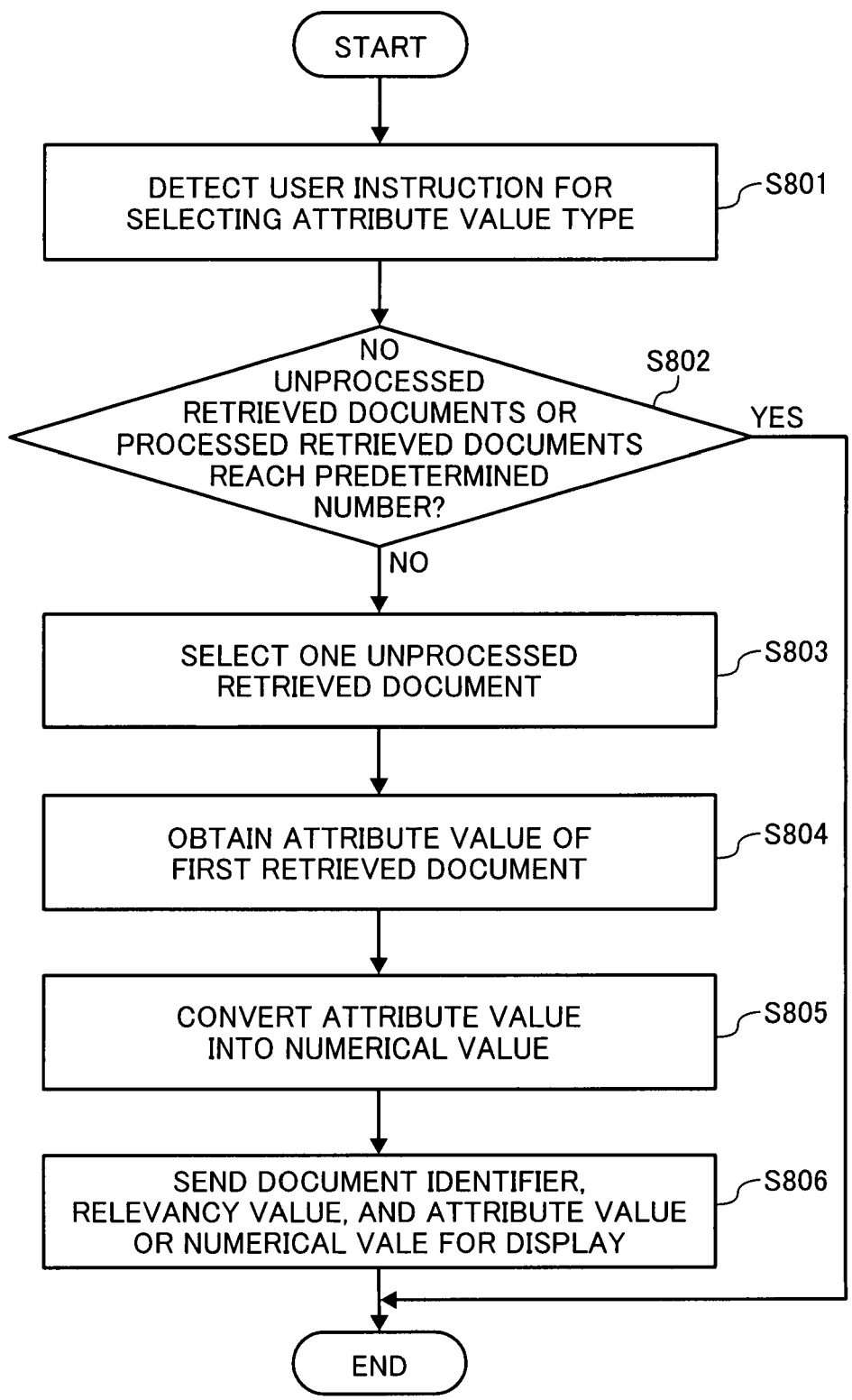
FIG. 14 is a flowchart illustrating operation of outputting an initial search result, performed by the document search apparatus of FIG. 1, according to an example embodiment of the present invention.

Referring to FIG. 14, S801 detects a user instruction for selecting at least one attribute value type, for example, through the user instruction input 7. For example, the user may select the attribute value type from a list of attribute value types available for use, which may be displayed in a pull-down menu or a list box provided on the coordinate system display 6.

S802 determines whether all first retrieved documents are processed, or the number of processed first retrieved documents reaches a predetermined number. When all first retrieved documents are processed or the number of processed first retrieved documents reaches the predetermined number ("YES" at S802), the operation ends. When at least one first retrieved document is not processed or the number of processed first retrieved documents is less than the predetermined number ("NO" at S802), the operation processed to S803.

S803 selects one first retrieved document from the first retrieved documents as a selected first retrieved document.

S804 obtains the attribute value of the type selected at S801, that corresponds to the selected first retrieved document, from the document database.

S805 obtains a numerical value that corresponds to the attribute value of the selected first retrieved document, in a substantially similar manner as described above referring to S104 of FIG. 3.

S806 sends the document identifier, the relevance value, and the attribute value or the numerical value to the coordinate system display 6.

S803 to S806 are repeated until all first retrieved documents are processed or the number of processed first retrieved documents reaches the predetermined number. For example, when the number of first retrieved documents are relatively large, the document search apparatus 10 may restrict the number of first retrieved documents such that a predetermined number of the first retrieved documents having high relevance values are sent to the coordinate system display 6.

The operation of FIG. 14 may be performed in various other ways. For example, in alternative to obtaining the attribute value from the document database after the attribute value type is selected by the user, the document search apparatus 10 may obtain a plurality of kinds of attribute values available for use, from the document database before the selection of the attribute value type by the user.

Numerous additional modifications and variations are possible in light of the above teachings. It is therefore to be understood that within the scope of the appended claims, the disclosure of this patent specification may be practiced in ways other than those specifically described herein.

For example, elements and/or features of different illustrative embodiments may be combined with each other and/or substituted for each other within the scope of this disclosure and appended claims.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, involatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

The invention claimed is:

1. A document search apparatus comprising a processor coupled to a memory, and further comprising:
   a search request input to input a search request including a keyword set;
   a user interface to cause a display to display an initial search result to a user, the initial search result comprising a first retrieved document set retrieved from a plurality of documents stored in a document database using the keyword set of the search request;
   an extension word extractor to extract an extension word set from a seed document set, the seed document set being selected by the user from the first retrieved document set of the initial search result;
   a database manager to search through the plurality of documents stored in the document database for a second retrieved document set using the keyword set of the search request and the extension word set, wherein
   a first retrieved document of the first retrieved document set is displayed as a symbol having a position on a coordinate system, the position being defined by a relevance value of the first retrieved document of the first retrieved document set, and at least one attribute value of the first retrieved document of the first retrieved document set being converted to a numerical value when the at least one attribute value of the first retrieved document of the first retrieved document set is not expressed in a form of the numerical value; and wherein
   the first retrieved document is classified into a group of a plurality of groups according to the relevance value, and a weighting factor is assigned to each group of the plurality of groups.

2. The apparatus of claim 1, wherein the user interface is further operable to display, upon detecting a user instruction performed on the symbol being displayed, additional information regarding the first retrieved document represented by the symbol.

3. The apparatus of claim 1, wherein the user interface is operable to detect a user instruction for specifying at least one point in the coordinate system, and select the seed document set according to an area defined by the at least one point being specified by the user instruction.

4. The apparatus of claim 1, wherein the user interface is further operable to detect a user instruction for moving the position of the symbol to a desired position on the coordinate system, and store the desired position being specified by the user instruction in a corresponding manner with identification information of the first retrieved document represented by the symbol.

5. The apparatus of claim 1, wherein the extension word set is extracted based on a usefulness value of a word included in a seed document of the seed document set, the usefulness value being obtained using a weighting factor of the seed document of the seed document set.

6. The apparatus of claim 5, wherein the user interface is further operable to detect a user instruction for moving the position of the symbol to a desired position on the coordinate system before the first retrieved document represented by the symbol is selected as the seed document of the seed document set, and send information regarding the desired position to the extension word extractor together with identification information of the seed document, and wherein the extension word extractor is further configured to update the weighting factor of the seed document using the desired position.

7. The apparatus of claim 1, wherein the user interface is further operable to detect a user instruction for changing a type of the at least one attribute value being displayed on the coordinate system, and change appearance of the initial search result according to the user instruction.

8. A computer implemented method for searching a document using a system having a processor coupled to a memory, the method comprising:
   inputting a search request including a keyword set;
   searching through a plurality of documents stored in a document database for one or more first retrieved documents that match the keyword set of the search request to obtain an initial search result, the initial search result comprising a document identifier, a relevance value, and at least one attribute value for each one of the one or more first retrieved documents;
   displaying the initial search result to a user;
   selecting one or more seed documents as a seed document set from the one or more first retrieved documents according to a user instruction performed on the initial search result being displayed;
   extracting an extension word set from the seed document set; and
   searching through the plurality of documents stored in the document database for one or more second retrieved documents that match the keyword set of the search request and the extension word set, wherein the displaying the initial search result comprises:
      converting the at least one attribute value to a numerical value when the at least one attribute value is not expressed in a form of the numerical value;
      defining a position of at least one of the one or more first retrieved documents on a coordinate system, using the relevance value and the at least one attribute value or the numerical value of the at least one of the one or more first retrieved documents;
      placing a symbol at the defined position; and
      storing the defined position in a corresponding manner with the document identifier of the at least one of the one or more first retrieved documents, wherein the one or more first retrieved documents are classified into one or more groups according to the relevance values, and a weighting factor is assigned to each group of the one or more groups.

9. The method of claim 8, wherein displaying the initial search result further comprises:
    detecting a user instruction for requesting additional information regarding at least one of the one or more first retrieved documents, the user instruction being performed on the initial search result being displayed;
    obtaining the additional information regarding the at least one of the one or more first retrieved documents; and
    displaying the additional information to the user.

10. The method of claim 8, wherein selecting the one or more seed documents comprises:
    detecting the user instruction, the user instruction specifying at least one point on the coordinate system; and
    obtaining identification information of one or more symbols that are located within an area defined by the at least one point being specified by the user instruction,
    wherein the one or more seed documents being selected as the seed document set are identified using the identification information being obtained.

11. The method of claim 8, wherein extracting the extension word set comprises:
    segmenting at least one of the one or more seed documents into a plurality of words; and
    obtaining a usefulness value of at least one of the plurality of words,
    wherein the extension word set includes one or more words selected from the plurality of words based on the usefulness values.

12. The method of claim 8, wherein displaying the initial search result further comprises:
    detecting a user instruction for moving the position of the symbol to a desired position on the coordinate system;
    relocating the symbol at the desired position; and
    storing the desired position in a corresponding manner with the document identifier of the at least one of the one or more first retrieved documents.

13. The method of claim 8, wherein displaying the initial search result further comprises:
    detecting a user instruction for changing a type of the at least one attribute value of the first initial search result; and
    changing appearance of the initial search result being displayed to the user according to the user instruction.

14. A document search system comprising a processor coupled to a memory, and further comprising:
    a search request input to input a search request including a keyword set;
    a user interface to cause a display to display an initial search result to a user, the initial search result comprising a first retrieved document set retrieved from a plurality of documents stored in a document database using the keyword set of the search request;
    an extension word extractor to extract an extension word set from a seed document set, the seed document set selected by the user from the first retrieved document set of the initial search result;
    a database manager to search through the plurality of documents stored in the document database for a second retrieved document set using the keyword set of the search request and the extension word set, wherein
    a first retrieved document of the first retrieved document set is displayed as a symbol having a position on a coordinate system, the position being defined by a relevance value of the first retrieved document of the first retrieved document set, and at least one attribute value of the first retrieved document of the first retrieved document set being converted to a numerical value when the at least one attribute value of the first retrieved document of the first retrieved document set is not expressed in a form of the numerical value; and wherein
    the first retrieved documents are classified into one or more groups according to the relevance values, and a weighting factor is assigned to each group of the one or more groups.

15. The system of claim 14, wherein the user interface is operable to detect a user instruction and cause at least one of the display, the extension word extractor, the database manager, and the user interface to perform an operation according to the detected user instruction,
    wherein the user instruction being at least one of:
    a user instruction for requesting additional information regarding one of the first retrieved documents represented by the symbol;
    a user instruction for specifying at least one point on the coordinate system;
    a user instruction for moving the position of the symbol to a desired position on the coordinate system; and
    a user instruction for changing a type of the at least one attribute value displayed on the coordinate system.

* * * * *